Oct. 15, 1963     C. R. STEIN     3,106,871

HYDRAULIC MOTOR

Filed Dec. 11, 1957     2 Sheets-Sheet 1

INVENTOR.
CLYDE R. STEIN
BY Elliott & Pastoriza
ATTORNEYS

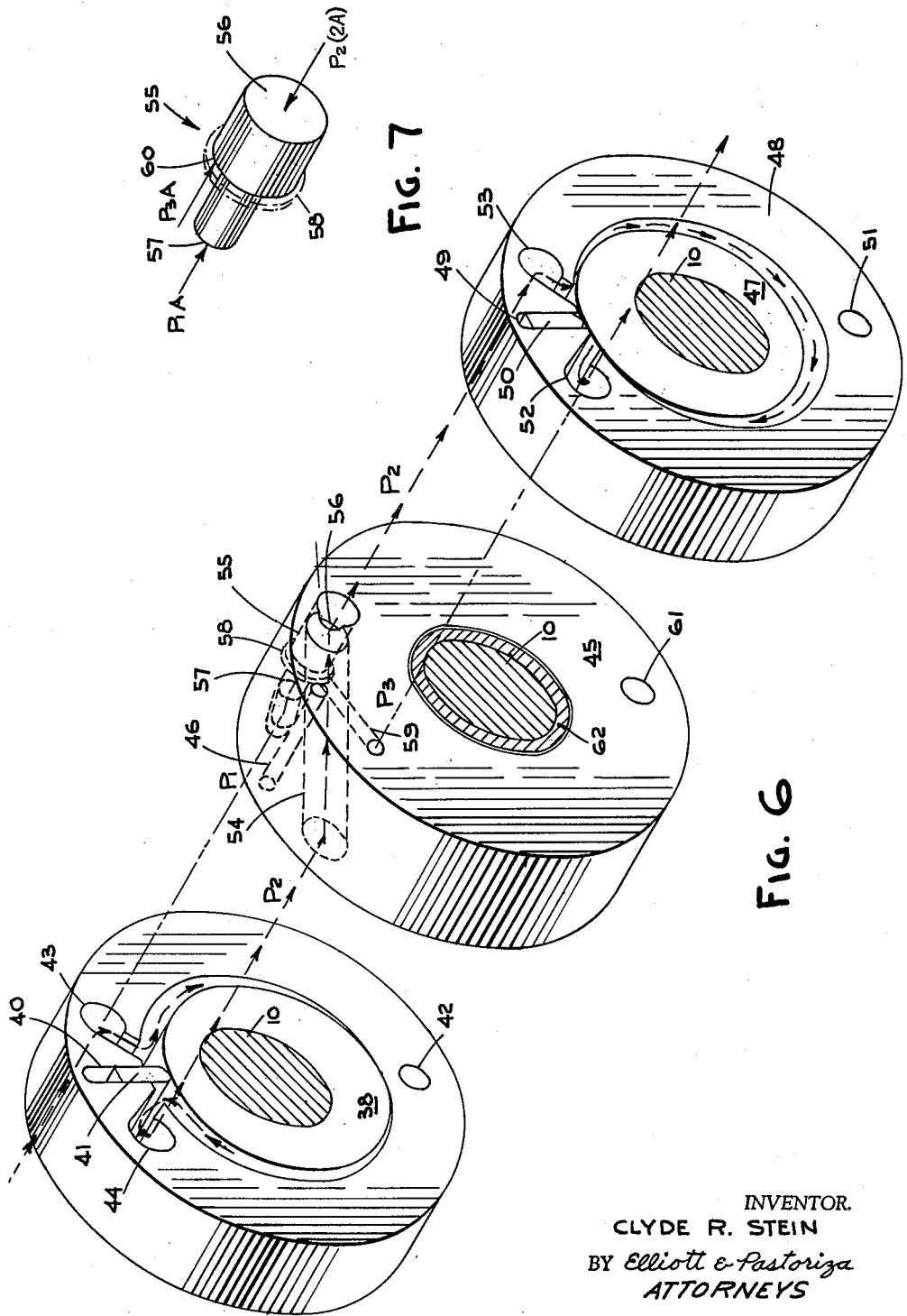

United States Patent Office 3,106,871
Patented Oct. 15, 1963

3,106,871
HYDRAULIC MOTOR
Clyde R. Stein, 11357 Rose Ave., Los Angeles 66, Calif.
Filed Dec. 11, 1957, Ser. No. 702,151
22 Claims. (Cl. 91—103)

This invention generally relates to a positive displacement type of fluid motor, and more particularly concerns a high pressure, high speed hydraulic motor. Although the present invention is primarily designed for relatively high speed operation, it will be appreciated that the fluid motor may be advantageously employed even in relatively low speed applications.

Conventional positive displacement type fluid motors generally comprise several plungers or pistons connected to a crankshaft or inclined plane and operating in a cylinder block. The pistons are forced out of the cylinder by fluid pressure and are thereafter returned by the action of the crankshaft or inclined plane. For example, the force exerted by the piston or pistons on the inclined plane produces the necessary torque and a resultant rotary motion. However, in these devices the maximum speed of the motor is limited by the excessive wear of the sliding parts and excessive inertia loads as well as by the high bearing loads which result from the combination of high speed together with high fluid inlet pressures. Furthermore, present positive displacement fluid motors usually incorporate a considerable number of parts in a relatively complex mechanical configuration taking into consideration the function being performed. Additionally, such fluid motors are inherently bulky because of their mechanical structure and are often of a massive design for the amount of powder produced.

As a consequence, it is an object of the present invention to provide a fluid motor of a design such that the motor may be operated at relatively high speeds with a minimum amount of friction and inertia loading whereby a relatively maintenance-free apparatus is attained.

Another object of the present invention is to provide a fluid motor which is susceptible of manufacture with relatively small overall dimensions, and yet which is simple and rugged in its design, and which may be manufactured to have a weight appreciably less than conventional fluid motors functioning for the same purpose, wherein the fluid motor of the present invention is particularly adaptable for employment in aircraft or missile applications.

Another object of the present invention is to provide a fluid motor having a relatively high volumetric efficiency with a relatively low leakage rate.

A further object of the present invention is to provide a fluid motor which is susceptible of economical manufacture on a production line basis, and which requires a relatively few number of parts.

A still further object of the present invention is to provide a fluid motor without significant static or dynamic unbalance.

These and other objects and advantages of the present invention are generally achieved by providing a fluid motor or hydraulic motor operated by a source of pressurized fluid, which includes a shaft, a casing or housing encircling the shaft, and bearing means rotatably supporting the shaft within the casing.

Liner means are either integrally formed with the casing on the inner surface thereof or are separately disposed therein in co-axial relationship with the shaft. Eccentric cam means are coupled for rotation with the shaft. The eccentric cam means have peripheral surfaces, respectively, with one portion thereof radially spaced from the liner means and another portion thereof substantially tangentially in contact with the liner means. Sliding vane means extend radially between the liner means and the peripheral surface. The sliding vane means may either be movable generally radially from slots within the liner means or from slots within the cam means depending upon the particular fluid passage means employed as hereafter mentioned.

Means defining a first fluid passage communicates from the fluid source to the peripheral surface of the cam means on one side of the vane means, and means defining a second fluid passage communicates from a fluid outlet to the surface on the other side of the vane means. Transverse plate means are supported within the casing so as to axially constrain flow of the fluid from the first fluid passage means to the second fluid passage means to a circumferential movement between the cam means and the liner means.

In a preferred form of the invention, an auxiliary fluid passage communicates from the pressurized fluid to the vane means so as to exert a force on and actuate the vane means as the radial spacing between the liner means and the cam means varies.

Also, in a preferred embodiment, the cam means comprise at least two cam members with their eccentricities angularly spaced in equal angular relationship. With such a construction, a relatively constant torque is produced for rotation of the shaft.

Additionally, as an important feature of the invention, pressure control means are employed which are responsive to the inlet pressure at each cam member and which further may be subject to the discharge pressure of the overall motor, whereby a proportioning of pressure between the cam members according to a predetermined relationship may be attained. These and other features of the present invention will become clearer as the specification proceeds.

In this regard, a better understanding of the invention will be had by reference to the drawings, showing only one illustrative embodiment thereof, and in which:

FIGURE 6 is an exploded perspective view of a portion of the fluid motor of FIGURE 1 with the shaft rotated 180°; and, FIGURE 7 is an enlarged perspective view of the differential piston means employed for the pressure control means.

Figure 1:
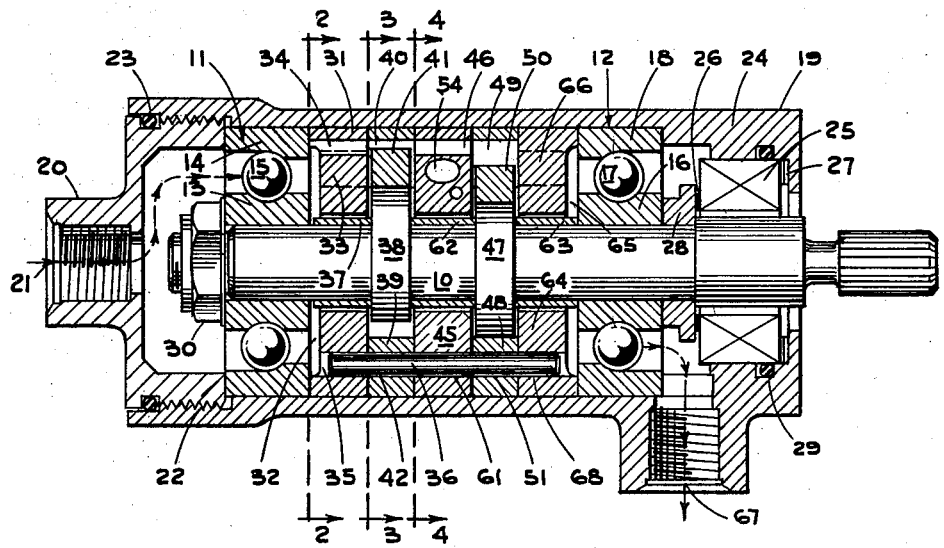
FIGURE 1 is a sectional view of a fluid motor according to the present invention.

Referring now to the drawings, there is shown in FIGURE 1 a shaft 10 supported within bearing members generally designated by the numerals 11 and 12. For purposes of illustration, the bearing members 11 and 12 are shown as ball bearing units with the bearing 11 comprising an inner race 13, an outer race 14, and balls 15 interposed therebetween. Similarly, the bearing 12 includes an inner race 16, balls 17, and an outer race 18.

The shaft 10 is encircled by the casing 19, the latter having coupled thereto an end cap 20. The end cap 20 is provided with a port 21 adapted to be connected with a source of pressurized fluid for flow therethrough as indicated by the arrows. The end cap 20 may be threaded as at 22 to the casing 19 and an O-ring or other sealing member 23 is provided in order to effect a fluid type seal.

At the other end of the shaft 10, the casing 19 terminates in an inwardly stepped portion 24 designed to accommodate a conventional sealing member 25 which is partially indicated schematically. The sealing member 25 has extending from one end thereof a seal 26, and is provided at the other end thereof with annular shim members 27. The shim members 27 force the seal 25, 26 against an annular face plate 28, which in turn abuts against the bearing 12. In addition, an O-ring or sealing member 29 is provided between the casing 19 and the sealing member 25.

The shaft 10 is locked in place within the casing 19 as with a lock nut 30, provided at the left hand end of the shaft as viewed in FIGURE 1.

Figure 2:
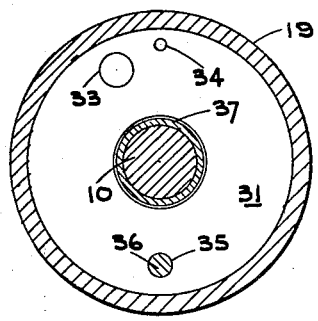
FIGURE 2 is a transverse view of FIGURE 1 taken in the direction of the arrows 2—2.

The pressurized fluid is adapted to flow through the port 21 and thereafter through the bearing 11, as between the races 13 and 14. The fluid then contacts a transverse member or end plate 31. The end plate 31 is provided with a circular recessed portion 32 communicating with a duct or main fluid passage 33 extending axially through the end plate 31. Additionally, an auxiliary fluid passage or axial duct 34 extends through the end plate 31 near the circumferential edge thereof. The end plate 31 is also provided with a bore 35 designed to partially accommodate an axially extending retaining pin 36, the purpose of which will become clear as the specification proceeds. The relative positioning of the passages 33 and 34 as well as the bore 35 may be more clearly seen in the view of FIGURE 2. The end plate 31 is co-axially disposed about the shaft 10 and is radially spaced a slight distance from a spacer 37, the latter being coupled for rotation with the shaft.

Upon impinging the end plate 31, the fluid is forced to take a path through the passages 33 and 34. The main passage 33 of the end plate 31 is aligned to communicate with liner means encircling a cam 38. The liner means may comprise an annular liner 39, as more clearly shown in the view of FIGURE 3, which is forced fitted within the casing 19.

The liner 39 has an axially extending slot 40 cut therethrough, the radial outer end of which communicates with the passage 34 of the end plate 31. The slot 40 has slidably positioned therein a radially movable vane member 41 adapted to maintain contact with the surface of the eccentric cam 38. The cam 38 is in turn coupled to the shaft 10 for effecting the rotation thereof. The liner 39 is further provided with a bore 42 through which the pin 36 passes.

As the fluid flows through the passage 33 of the plate member 31, it is directed into an inlet port in the liner in the form of slot 43, and thereafter moves radially inward to exert a pressure against the cam 38. Furthermore, the fluid passing through passage 34 of the plate 31 communicates with the slot 40 such that the vane member 41 is urged radially inward. Thus, the fluid passing through the inlet port 43 is constricted between the liner 39, the cam 38, and the vane 41 so as to cause a counter clockwise rotation of the cam 38, as viewed in FIGURE 3. As the cam 38 rotates because of the torque moment imposed upon it, the fluid will move circumferentially between the cam 38 and the liner 39 to the other side of the vane 41 to ultimately pass into an outlet groove section 44 and complete the first pressure stage of the unit. It should be noted at this point that the transverse surfaces of the end plate 31 and the liner 39 are in contact and machined smooth such that appreciably no leakage can occur radially between these members.

Figure 4:
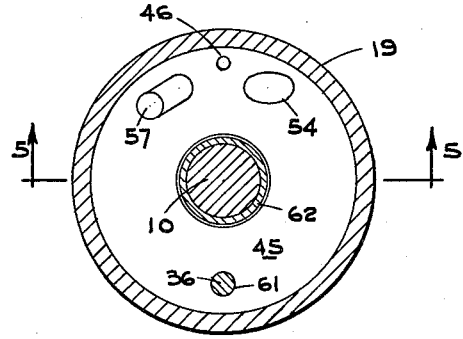
FIGURE 4 is a transverse view of the fluid motor of FIGURE 1 taken in the direction of the arrows 4—4.
Figure 5:
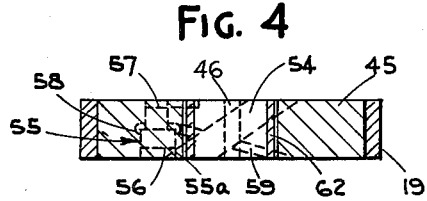
FIGURE 5 is a view of the plate member of FIGURE 4 taken in the direction of the arrows 5—5.

After being channeled to the groove 44 of the liner 39, fluid is then forced to move axially through the next transverse plate member 45, which is perhaps more clearly shown in the views of FIGURES 4 and 5. The plate 45 is axially interposed between the cam member 38 and a second stage cam means. For this reason, the plate 45 has an axially extending passage 46 communicating with the passages 34 and 40 heretofore described, permitting pressure on the inlet fluid to act on the vane associated with a second stage cam member 47. The other passages within the plate member 45 may be more clearly understood after a description of the second cam member 47. The cam member 47 is disposed within a liner 48, the liner 48 being identical in construction to the liner 39. Thus, the liner 48 is provided with a slot 49 accommodating a vane 50. The slot 49 communicates with the passage 46 of the intermediate plate 45 whereby pressure is imposed upon the vane 50 as heretofore described. The liner 48 is further provided with a bore 51 for extending of the pin 36 therethrough.

It is to be noted, as illustrated in the view of FIGURE 1, that the cam members 38 and 47 are angularly positioned or coupled to the shaft 10 such that their eccentricities are 180° apart. Of course, it is conceivable that additional stages and cam members coupled be employed. In such case, it would again be essential that the cam members be angularly spaced about the shaft such that a constant torque could be imposed upon the shaft 10 as each cam member rotates from its zero to maximum torque value. Thus, in the view of FIGURE 3, the cam member 38 is shown positioned such that substantially zero torque is imposed upon the cam member, in view of the fact that the inlet port 43 is substantially in communication with the outlet port 44 on the other side of the vane 41. On the other hand, the cam member 47 has its eccentricity in diametrically opposed relationship such that at the particular position shown in FIGURE 1, the cam member 47 is imposing its maximum torque upon the shaft 10.

As shown in FIGURE 6, the liner 48 is provided with an axially extending slot or outlet port 52 and another axially extending slot or inlet port 53.

The functions of the intermediate or center plate 45 may now be described in conjunction with the views of FIGURE 4, FIGURE 5, and FIGURE 6. After the fluid is exhausted from the liner 39 through the groove passage 44, the fluid passes into a cross drilled passage 54 in the plate 45. The other end of the passage 54 communicates with the inlet port 53 of the second stage liner means 48. Thereafter, the fluid flows circumferentially between the liner 48 and the cam 47 in a counter clockwise direction (as viewed from the left hand end of the exploded view of FIGURE 6) to finally come to the exhaust port 52 on the other side of the vane 50. Before explaining the final passage of the fluid through the unit, the other passages indicated in the intermediate plate 45 will be described.

As shown clearly in the views of FIGURE 5 and FIGURE 6, there is disposed within the center plate 45 an axially extending differential piston means generally indicated by the numeral 55. This piston means is clearly shown in the view of FIGURE 7. The function of the piston means is for the purpose of proportioning the respective pressures of the first stage and second stage of the unit. For this purpose, the large end 56 of the piston 55 communicates through a passage in the plate 45 with one end of the passage 54, as clearly shown in the view of FIGURE 6. The smaller end 57 of the piston 55 similarly communicates through a grooved surface on the other end of the plate 45 with the inlet port or passage 43 to the first cam member 38. In addition, an annular groove or chamber 58, clearly shown in the view of FIGURE 5, is disposed around the piston 55 at the point where its area changes. This annular chamber or groove 58 communicates through a passage 59 to an outlet in the plate 45 aligned with the outlet port 52 of the liner member 48.

Thus, as shown in FIGURE 7, the inlet pressure, designated at $P_1$, to the first stage or cam 38 of the unit is acting against the end surface 57 of the piston 55 with a total force of $P_1A$. Similarly, the inlet pressure, designated as $P_2$, to the second stage or cam member 47 of the unit is acting against the large end 56 of the piston 55 with a force, for example, of $P_2(2A)$. Thus, in the example taken for illustrative purposes in FIGURE 7, the end surface 56 has an area equal to twice the area of the end surface 57.

Figure 3:
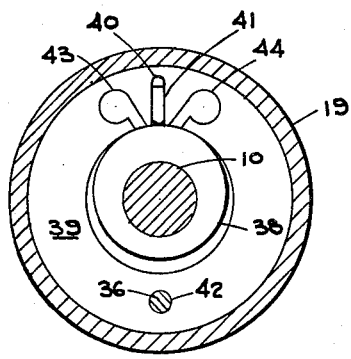
FIGURE 3 is a transverse view of the fluid motor of FIGURE 1 taken in the direction of the arrows 3—3.

In addition, the discharge pressure of the unit or exhaust pressure of the second cam member 47, indicated by $P_3$, is acting through the passage 59 against the annular area 60 with a force equal to $P_3A$. Again, for illustrative purposes, this annular area is equal to "A" since it represents the difference between the end surface 57 and the end surface area 56. Thus, for stability of the differential piston 55, the pressure acting on the cam 47 or the second stage pressure $P_2$ is equal to the total of the inlet pressure to the unit, $P_1$, plus the outlet pressure from the unit, $P_3$, divided by two. In order to maintain this relationship, the differential piston 55 is located within a chamber 55a sufficiently long to permit limited movement of the piston 55 to restore the second stage pressure on the cam 47 to the desired value even though leakage may occur past the cam 38 and/or the cam 47. The differential piston also functions to enable the second stage inlet pressure to be maintained even though manufacturing variations may result in the displacement of fluid in the first stage at a slightly different rate from the displacement of fluid in the second stage cam member. Additionally, the differential piston makes it possible to restore the desired second stage inlet pressure very rapidly after the first and second stage cams have passed through the vertical position as indicated in FIGURE 3, where the inlet port 43 and outlet port 44, for example, are substantially connected by a flow path around the cam. It is to be further noted that at the instant when the ports 43 and 44, for example, are so connected the fluid flow rate does not suddenly increase because only one cam 38 is so shunted at a time. However, the second stage pressure may fluctuate towards motor inlet and motor outlet pressures when the first and second stages, respectively, are so shunted. The differential piston then rapidly returns this second stage pressure to the desired value after such shunting occurs.

The plate 45 similarly includes a bore 61 to enable passage of the pin 36 therethrough and further surrounds the spacer member 62 coupled to the shaft 10. The spacer 62 has an axial width slightly greater than the width of the plate member 45, whereby this spacer serves to position the cam 38 at slight axial distance from the plate member 45 to prevent friction therebetween.

There is further provided another spacer 63 (functioning similar to spacer 62) on the other side of the cam 47 about which is disposed a plate 64 similar to the plate 31 previously described. The plate member 64 is similarly provided with a circular recessed portion 65, and furthermore includes a passage 66 which communicates with the outlet port 52 of the plate member 48. Thus, the fluid from the outlet port 52 passes through the passage 66 and thereafter through the bearing 12 in between the races 16 and 18 thereof to be exhausted through a port 67 in the direction of the arrows as indicated. The plate 64 further includes a drilled hole 68 also accommodating the pin 36.

It should be noted at this time that the pin 36 passes through the stationary plate member 31, the liner 39, plate 45, the liner 48, and the plate 64 such that all these units are angularly retained in positive positioning within the casing 19, and furthermore that the pin is closely fitted within these bores preventing leakage therethrough.

It will be evident that the fluid inlet pressure communicates through the passage 34 of the plate 31 to the vane 41 in the liner 39 as one branch circuit and thereafter through the passage 46 to the vane 50 in the liner 48 as another branch circuit. Thus, the inlet pressure will at all times be acting on the vanes 41 and 50. As one vane 41 moves, for example, into the position shown in FIGURES 1 and 3, the other vane 50 will be moving radially downward. Thus, the fluid displaced as the vane 41 rises will pass into the volume formerly occupied by the vane 50. It will also be appreciated as a consequence of this design that the only friction of the vane will be in a normal direction to the cam members whereby a minimum amount of frictional loss occurs.

It will be appreciated that many changes and modifications may be made in the fluid motor of the present invention without departing from the spirit and scope thereof. Certain of these modifications and design details are well known in the art and have for this reason not been described. For example, it will be appreciated that in order that the fluid motor be properly dynamically balanced, in view of the cam eccentricities, it is desirable to impose eccentric loads on the front end and rear end of the unit. It is to be realized that the fluid passage shown as a means of directing the inlet fluid to the various cam stages may vary with different constructions, and for example, could pass radially through the casing into the liners or could pass through the shaft and radially outwardly through the cam members. In the latter instance, it would of course be necessary to have the vane members extending radially from the cam members instead of employing the construction shown. These design changes and additions are deemed to be within the scope of the present invention as set forth in the following appended claims.

What is claimed is:

1. A fluid motor operated by a source of pressurized fluid, said motor comprising: a shaft; a casing encircling said shaft; bearing means rotatable supporting said shaft within said casing; liner means disposed within said casing in co-axial relationship with said shaft; a plurality of cam members coupled for rotation with said shaft, said cam members each having a peripheral surface upon which one portion thereof is radially spaced from said liner means and another portion substantially in tangential contact with said liner means, said cam members being axially spaced on said shaft such that the eccentricities of said cam members are separated by substantially equal angles; sliding vane means, respectively, extending radially between said liner means and each cam member peripheral surface; fluid passage means communicating with said cam members in series between one cam member surface on an outlet side of said vane means to another cam member surface on the inlet side of said vane means; transverse plate means supported within said casing on each side of each cam member to axially constrain flow of said fluid to movement between each cam member and said liner means from one side of said vane means to the other side of said vane means; said liner means, said plate means, said cam means, and said fluid passage means, defining a fluid occupied variable volume chamber between said outlet side of one of said vane means to the inlet side of the next in series of said vane means; and, movable control means responsive to the pressure of said chamber and to the pressure on the inlet side of said one of said vane means to vary the volume of said chamber.

2. The subject matter according to claim 1, in which said movable control means is also responsive to the pressure on the outlet side of the next in series of said vane means.

3. In a positive displacement type fluid motor including at least a first stage and a second stage of equal displacement coupled in series and defining therebetween an intermediate pressure: means designed to vary said intermediate pressure, said means operating independently of the total displacement characteristics of either of said stages and said means being responsive to the inlet pressure of said first stage, the discharge pressure of said second stage, and said intermediate pressure.

4. In a positive displacement type fluid motor including a first stage and a second stage of equal displacement coupled in series and defining therebetween an intermediate pressure: movable means to vary said intermediate pressure, said movable means being subject to opposing forces responsive, respectively, to said intermediate pressure and to the sum total of the discharge pressure of said second stage and the inlet pressure of said first stage.

5. The subject matter, according to claim 5, in which said movable means comprises a differential piston having one end area thereof subject to said first stage inlet pressure and the other end area thereof subject to said intermediate pressure, and an intermediate annular area on said piston subject to said second stage discharge pressure.

6. In a fluid motor: a first stage having a positive displacement means; a second stage having a positive displacement means, said second stage being in series with said first stage, and said first stage and second stage each having an equal displacement and defining therebetween fluid passage means of an intermediate volume characterized by an intermediate pressure; movable means controlling said intermediate pressure by varying said intermediate volume, said movable means performing work only by movement of said fluid independently of the total displacement characteristics of each of said stages, and said movable means being directly responsive to said intermediate pressure and to the discharge pressure of said second stage.

7. In a fluid motor: a first stage having a positive displacement means; a second stage having a positive displacement means, said second stage being in series with said first stage, and said first stage and second stage each having an equal displacement and defining therebetween fluid passage means of an intermediate volume characterized by an intermediate pressure; movable means controlling said intermediate pressure by varying said intermediate volume, said movable means performing work only by movement of said fluid independently of the total displacement characteristics of each of said stages, and said movable means being responsive to said intermediate pressure and to the inlet pressure of said first stage.

8. In a fluid motor: a first stage having a positive displacement means; a second stage having a positive displacement means, said second stage being in series with said first stage, and said first stage and second stage each having an equal displacement and defining therebetween fluid passage means of an intermediate volume characterized by an intermediate pressure; movable means to vary said intermediate volume, said movable means being responsive to said intermediate pressure, the discharge pressure of said second stage and the inlet pressure of said first stage.

9. The subject matter, according to claim 8, in which said means to vary said intermediate volume is responsive to one force proportional to said intermediate pressure and another opposing force proportional to said discharge pressure of said second stage and said inlet pressure of said first stage.

10. In a positive displacement fluid motor including at least a first stage and a second stage of equal displacement coupled in series and defining therebetween an intermediate pressure: means designed to vary said intermediate pressure, said means performing work only by movement of fluid independently of the total displacement characteristics of said stages, and said means being directly responsive to said intermediate pressure and to the inlet pressure of said first stage.

11. In a positive displacement type fluid motor including at least a first stage and second stage of equal displacement coupled in series and defining therebetween an intermediate volume characterized by an intermediate pressure: means controlling said intermediate pressure by varying said intermediate volume, said means performing work only by movement of said fluid independently of the total displacement characteristics of said stages, and said means being directly responsive to said intermediate pressure and to the discharge pressure of said second stage.

12. In a fluid motor: a first stage having a fixed displacement means; a second stage having a fixed displacement means, said second stage being in series with said first stage and said first stage and second stage each having an equal displacement and defining therebetween fluid passage means of an intermediate volume characterized by an intermediate pressure; movable means controlling said intermediate pressure by varying said intermediate volume, said movable means being responsive to said intermediate pressure and to the discharge pressure of said second stage.

13. In a fluid motor: a first stage having a fixed displacement means; a second stage having a fixed displacement means, said second stage being in series with said first stage, and said first stage and second stage each having an equal displacement and defining therebetween fluid passage means of an intermediate volume characterized by an intermediate pressure; movable means to vary said intermediate volume, said movable means being responsive to said intermediate pressure and to the inlet pressure of said first stage.

14. In a positive displacement type fluid motor including at least a first stage and a second stage of equal displacement in series and defining therebetween an intermediate volume characterized by an intermediate pressure: free piston means designed to vary said intermediate volume, said free piston means being responsive to said intermediate pressure and to the discharge pressure of said second stage.

15. In a positive displacement type fluid motor including at least a first stage of fixed displacement and a second stage of the same fixed displacement in series and defining therebetween an intermediate pressure: means coupling said first stage and second stage for driving at the same speed; and, means designed to vary said intermediate pressure, said latter mentioned means being responsive to said intermediate pressure and to the inlet pressure of said first stage.

16. In a positive displacement type fluid motor including at least a first stage of fixed displacement and a second stage of the same fixed displacement in series and defining therebetween an intermediate volume characterized by an intermediate pressure: means coupling said first stage and said second stage for driving at the same speed; and, means designed to vary said intermediate pressure said latter mentioned means being responsive to said intermediate pressure and to the discharge pressure of said second stage.

17. In a positive displacement type fluid motor including at least a first stage and a second stage of equal displacement coupled in series and defining therebetween an intermediate pressure: a first force transmitting member designed to vary said intermediate pressure, said force transmitting member being subject to one force proportional to said intermediate pressure, and an opposing force proportional to the sum total of the discharge pressure of said second stage and the inlet pressure of said first stage.

18. In a positive displacement type fluid motor including at least a first stage and a second stage of equal displacement coupled in series and defining therebetween an intermediate pressure: means designed to vary said intermediate pressure, said means sensing separately and being directly responsive to the inlet pressure of said first stage, the discharge pressure of said second stage, and said intermediate pressure.

19. In a positive displacement type fluid motor including at least a first stage having a given inlet pressure and a second stage having a given discharge pressure coupled in series, each said stage having an equal displacement, and defining therebetween an intermediate pressure: movable means designed to vary said intermediate pressure independently of the total displacement characteristics of either stage, said movable means being subject to opposing forces responsive only and, respectively, to said intermediate pressure, and at least one of the heretofore defined pressures characterizing said stages.

20. The subject matter, according to claim 19, in which said movable means is, respectively, subject to opposing forces responsive to said intermediate pressure and to said second stage discharge pressure.

21. In a positive displacement type fluid motor including at least a first stage having a given inlet pressure and a second stage having a given discharge pressure coupled in series and defining therebetween an intermediate pressure, each of said stages having a fixed and equal displacement: movable means to vary said intermediate pressure, said movable means being subject to opposing forces responsive only and, respectively, to said intermediate pressure and at least one of the heretofore defined pressures characterizing said stages.

22. The subject matter, according to claim 21, in which said movable means is, respectively, subject to opposing forces responsive to said intermediate pressure and to said second stage discharge pressure.

References Cited in the file of this patent

UNITED STATES PATENTS

| | | |
|---|---|---|
| 154,298 | Teal | Aug. 18, 1874 |
| 703,502 | Tuckfield | July 1, 1902 |
| 724,224 | Wiechmann | Mar. 31, 1903 |
| 1,825,661 | Gull | Oct. 6, 1931 |
| 1,877,091 | Vickers | Sept. 13, 1932 |
| 2,356,461 | Lepis | Aug. 22, 1944 |
| 2,458,452 | Vanni | Jan. 4, 1949 |
| 2,698,576 | Strub | Jan. 4, 1955 |
| 2,837,269 | Torell | June 3, 1958 |

FOREIGN PATENTS

| | | |
|---|---|---|
| 329,826 | France | June 11, 1903 |
| 928,079 | Germany | May 23, 1955 |